No. 789,073. PATENTED MAY 2, 1905.
L. B. SEITZ.
VEGETABLE SLICER AND GRATER.
APPLICATION FILED MAY 24, 1904.

2 SHEETS—SHEET 1.

Witnesses
Inventor
Louis B. Seitz.
By Victor J. Evans
Attorney

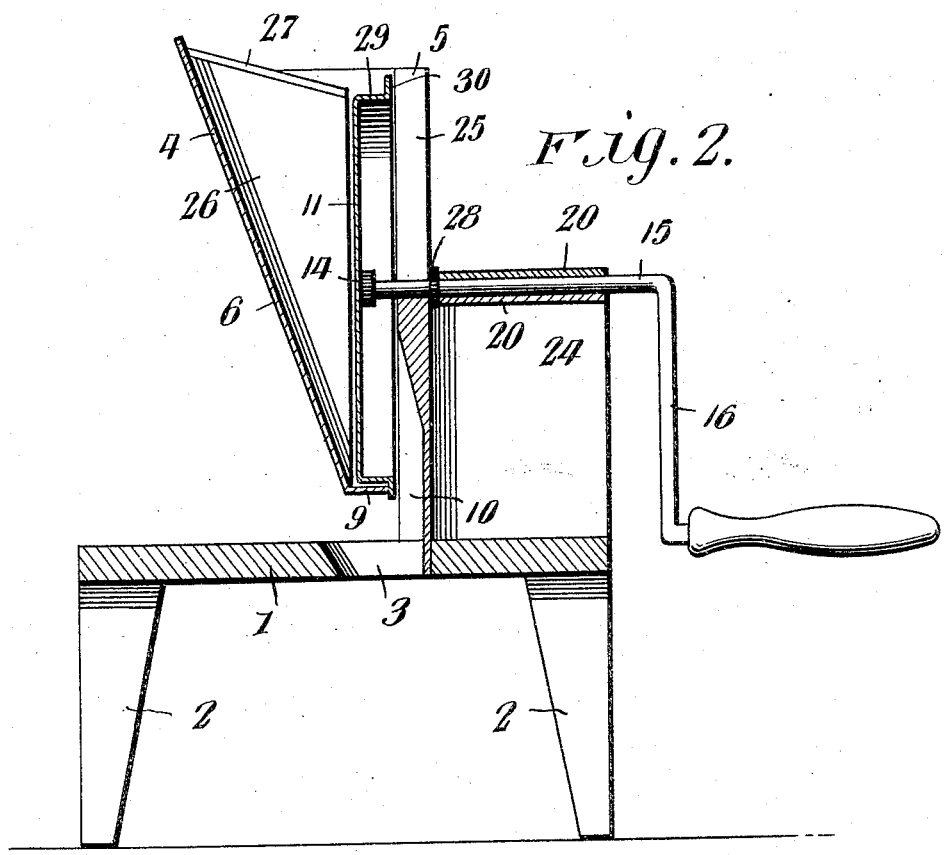
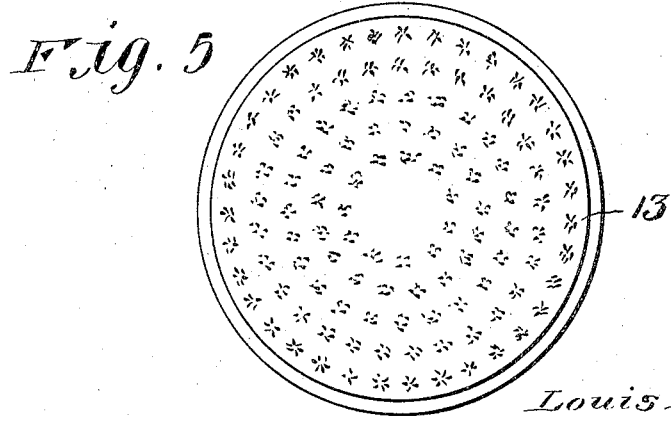

No. 789,073.  Patented May 2, 1905.

UNITED STATES PATENT OFFICE.

LOUIS B. SEITZ, OF WELLINGTON, MISSOURI.

VEGETABLE SLICER AND GRATER.

SPECIFICATION forming part of Letters Patent No. 789,073, dated May 2, 1905.

Application filed May 24, 1904. Serial No. 209,477.

*To all whom it may concern:*

Be it known that I, LOUIS B. SEITZ, a citizen of the United States, residing at Wellington, in the county of Lafayette and State of Missouri, have invented new and useful Improvements in Vegetable Slicers and Graters, of which the following is a specification.

This invention relates to vegetable slicers and graters, the object of the invention being to provide a rotary manually-operated slicing and grating machine which will greatly expedite the slicing and grating of various kinds of fruit and vegetables and at the same time render the operation perfectly safe to the operator.

A further object of the invention is to provide for the convenient and ready removal of the operating-shaft and cutter or grater, so that cutting and grating disks may be readily substituted one for the other or interchanged according to the nature of the work to be performed.

A further object of the invention is to provide, in connection with a suitable hopper and the cutter or grater, a combined divider and cutter which will separate the vegetables and fruit into sections as they are forced downward into the hopper and also divide separated sections, so that they will be simultaneously operated upon by different portions of the cutter or grater.

With the above and other objects in view, the nature of which will more fully appear as the description proceeds, the invention consists in the novel construction, combination, and arrangement of parts, as herein fully described, illustrated, and claimed.

Figure 1:
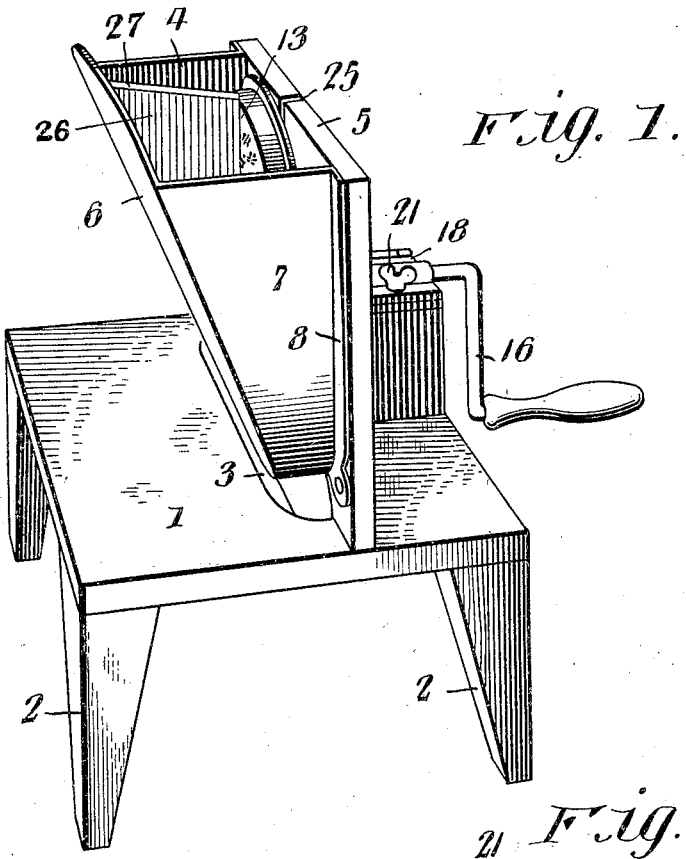
Figure 4:
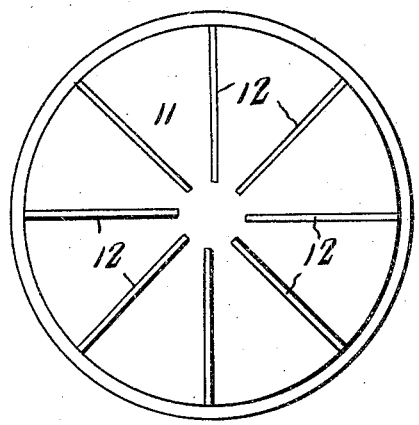
Figure 3:
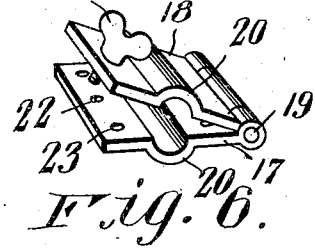
Figure 6:

In the accompanying drawings, Figure 1 is a perspective view of a vegetable cutter and slicer embodying the present invention. Fig. 2 is a vertical sectional view of the same, taken in line with the operating-shaft. Fig. 3 is a detail perspective view of the sectional and hinged bearing. Fig. 4 is a plan view of the cutter-disk, and Fig. 5 is a similar view of the grater-disk. Fig. 6 is a detail view showing the arrangement of the slanting blades.

Like reference-numerals designate corresponding parts in all the figures of the drawings.

Under the preferred embodiment of the present invention resort is had to a table 1, which is upheld at a suitable elevation by means of supporting-legs 2, the table being provided with a discharge-opening 3, through which the slices drop into a suitable receptacle placed beneath the table.

Located above the table 1 is a hopper 4, which preferably consists of a vertical side 5 and an inclined side 6, which converges toward the lower portion of the vertical side 5, as illustrated in Figs. 1 and 2. The vertical side 5 connects at its lower end rigidly to the table, and thereby forms the support for the hopper as a whole. The inclined or slanting side 6 is connected to the vertical side by means of end pieces 7, which may be formed integrally with the slanting side 6 and flanged, as shown at 8, to enable the side 6 and the ends 7 to be secured to the vertical side 5. The slanting side 6 is also provided along its bottom with a flange 9, which extends substantially in a horizontal direction toward the vertical side 5, as shown in Fig. 2. Opposite the lower portion of the hopper the vertical side 5 is cut away to form a hopper-outlet 10, which is located directly above the opening 3 in the table. Operating within the hopper is a disk 11, which may either be provided with radially-disposed slanting blades or knives 12 or with punched or rough-edged holes 13. In other words, disks of different characters may be employed, according as to whether the vegetables or fruit are to be sliced or grated. In either case the disk is provided with a hub 14, which is detachably connected to the inner end of an operating-shaft 15, the connection between the hub 14 and shaft 15 being made, preferably, by means of screw-threading one part upon the other, although any other desired coupling means may be employed. The disk 11 is rotated with the shaft 15, the latter being provided at its outer end with an operating-crank handle 16.

The shaft 15 is journaled intermediate its ends in a bearing which comprises a stationary member 17 and an upper hinged member 18, which is connected by a hinge-joint to the member 17, as shown at 19. The members of the bearing are provided with oppositely-located semicircular bearing portions 20 to receive the shaft 15, while the upper member is provided with a clamp, preferably in the form of a thumb-screw 21, which engages a threaded opening 22 in the lower member for retaining the shaft 15 in place and allowing the same to revolve freely. The lower member 17 is provided with holes 22 to receive screw-bolts or other suitable fastening devices by means of which the bearing as a whole is connected to a standard or to a pair of parallel standards 24, extending upward from the table 1. The vertical side 5 of the hopper is also provided with a slot 25, which extends from the upper edge of the side 5 downward far enough to receive the shaft 15 when placed between the members 17 and 18 of the bearing. The construction just described enables the shaft, together with the disk thereon, to be quickly and easily removed in order to substitute another disk and also enable the hopper to be cleaned.

Arranged in the hopper between the slicing or grating disk and the inclined wall 6 of the hopper is a combined divider and cutter 26, which extends from the side 6 inward to a point near the adjacent face of the disk, the said divider 26 being located about centrally or in line with the shaft 15, so as to separate the hopper into two substantially equal compartments. The upper edge of the divider 26 is sharpened to form a cutter 27, whereby the operator in forcing the vegetables or fruit downward into the hopper may simultaneously divide the same into sections, which sections fall into the separate compartments to be operated upon by the different portions of the cutting or grating disk. The sloping side 6 causes the sections of the vegetables or fruit to gravitate against the working face of the disk, thereby insuring the proper slicing or grating of the same during the rotation of the disk. The shaft 15 is provided with a stop-collar 28, which is fast on the shaft and lies between the bearing members 17 and 18 and the vertical side 5 of the hopper, said collar serving to properly position the shaft and the operating-disk, as shown in Fig. 2. The operating-disk is provided with a backwardly-extending rim or periphery 29, at the inner edge of which is an outwardly-extending circumferential flange 30, which plays along the adjacent edge of the inwardly-extending flange 9 at the bottom of the sloping side 6 of the hopper.

Changes in the form, proportion, and minor details of construction may be resorted to without departing from the principle or sacrificing any of the advantages of the invention.

Having thus described the invention, what is claimed as new is—

1. A machine of the class described comprising a table having an opening therein, a hopper supported on the table and provided with an outlet above the opening in the table, said hopper embodying a vertical side having a cut-away portion to form the hopper-outlet, and a slanting side which slopes toward the vertical side and is provided at the bottom with a flange extending toward the vertical side, a horizontal cutter-shaft provided with an operating-handle, and a disk mounted on said shaft and operating over the inwardly-extending flange of the slanting side, said disk operating in a plane transverse the width of the hopper, whereby said slanting side directs material to the disk.

2. A machine of the class described comprising a table having an opening therein, a hopper supported on the table and provided with an outlet over the opening in the table, said hopper being provided in one side with a slot extending from the upper edge downward, parallel standard extending upward from the table at one side of the hopper, a bearing mounted on said standard and comprising a stationary member and a folding member hinged thereto, a cutter-shaft journaled in said bearing and extending through the slot in the hopper, and an operating-disk on said shaft.

In testimony whereof I affix my signature in presence of two witnesses.

LOUIS B. SEITZ.

Witnesses:
 FRED KLOS,
 S. C. ARCHER.